(12) United States Patent
Pathiyal

(10) Patent No.: US 7,864,949 B2
(45) Date of Patent: Jan. 4, 2011

(54) KEYBOARD ARRANGEMENT AND MOBILE COMMUNICATION DEVICE INCORPORATING THE SAME

(75) Inventor: Krishna K. Pathiyal, Waterloo, Ontario (CA)

(73) Assignee: Research in Motion Limited, Waterloo, Ontario (CA)

( * ) Notice: Subject to any disclaimer, the term of this patent is extended or adjusted under 35 U.S.C. 154(b) by 1510 days.

(21) Appl. No.: 11/229,010

(22) Filed: Sep. 16, 2005

(65) Prior Publication Data

US 2006/0103553 A1    May 18, 2006

Related U.S. Application Data

(60) Provisional application No. 60/610,334, filed on Sep. 16, 2004.

(51) Int. Cl.
*H04M 1/00* (2006.01)
*H04M 9/00* (2006.01)

(52) U.S. Cl. .................. 379/433.07; 341/22

(58) Field of Classification Search ........... 379/433.01, 379/433.07; 345/168, 169, 689; 341/22, 341/23, 27, 72; 455/550.1, 575.1, 556.2, 455/90; 400/486, 489, 485, 490, 492
See application file for complete search history.

(56) References Cited

U.S. PATENT DOCUMENTS

| | | | | |
|---|---|---|---|---|
| 2,641,320 | A * | 6/1953 | Johnson | 234/123 |
| 4,799,254 | A * | 1/1989 | Dayton et al. | 379/93.26 |
| 6,731,913 | B2 * | 5/2004 | Humphreys et al. | 455/90.3 |
| 7,088,294 | B2 * | 8/2006 | Qi et al. | 343/702 |
| 7,096,036 | B2 * | 8/2006 | Griffin et al. | 455/553.1 |
| 7,097,511 | B1 * | 8/2006 | Chen et al. | 439/630 |
| 7,215,258 | B2 * | 5/2007 | Wormald | 341/23 |
| 7,224,292 | B2 * | 5/2007 | Lazaridis et al. | 341/22 |
| 7,272,411 | B2 * | 9/2007 | Griffin et al. | 455/550.1 |
| 7,283,065 | B2 * | 10/2007 | Scott et al. | 341/22 |
| 7,289,044 | B2 * | 10/2007 | Fux et al. | 341/22 |
| 7,312,726 | B2 * | 12/2007 | Fux et al. | 341/22 |
| 7,324,091 | B2 * | 1/2008 | Fyke | 345/168 |
| 7,352,296 | B2 * | 4/2008 | Fux et al. | 341/22 |
| 7,358,866 | B2 * | 4/2008 | Fux et al. | 341/22 |
| 7,363,063 | B2 * | 4/2008 | Zhu et al. | 455/575.1 |
| 7,367,843 | B2 * | 5/2008 | Chen et al. | 439/630 |
| 7,389,124 | B2 * | 6/2008 | Fux et al. | 455/550.1 |
| 7,403,165 | B2 * | 7/2008 | Qi et al. | 343/702 |
| 7,403,188 | B2 * | 7/2008 | Fux et al. | 345/168 |
| 7,405,703 | B2 * | 7/2008 | Qi et al. | 343/702 |

(Continued)

FOREIGN PATENT DOCUMENTS

JP    2004157956 A    6/2004

(Continued)

*Primary Examiner*—Hemant Patel
*Assistant Examiner*—Phylesha Dabney
(74) *Attorney, Agent, or Firm*—Novak Druce + Quigg LLP

(57) ABSTRACT

The array of keys constituting a numeric phone keypad on a mobile communication device only partially overlaps the array of keys that make up the text input keypad creating an offset so that only subsets of the keys constituting the two keypads are common to both. With this configuration, the numeric phone keypad can be more easily distinguished from the text input keypad while still reaping the benefits of having some shared keys.

12 Claims, 3 Drawing Sheets

U.S. PATENT DOCUMENTS

| | | | |
|---|---|---|---|
| 7,420,478 B2 * | 9/2008 | Wormald | 341/23 |
| 7,424,287 B2 * | 9/2008 | Vander Veen et al. | 455/414.4 |
| 2003/0011574 A1 | 1/2003 | Goodman | |
| 2004/0165924 A1 | 8/2004 | Griffin | |
| 2004/0227733 A1 | 11/2004 | Fyke et al. | |

FOREIGN PATENT DOCUMENTS

| | | |
|---|---|---|
| WO | WO 00/41061 | 7/2000 |
| WO | WO 03/085505 | 10/2003 |

* cited by examiner

KEYBOARD ARRANGEMENT AND MOBILE COMMUNICATION DEVICE INCORPORATING THE SAME

CROSS REFERENCE TO RELATED APPLICATION

This application claims priority of Provisional Patent Application Ser. No. 60/610,334, filed on Sep. 16, 2004.

BACKGROUND OF THE INVENTION

1. Field of the Invention

Aspects of this invention are directed to keyboard arrangements for mobile communication devices, and particularly, to keyboard arrangements that integrate yet differentiate two different keypads such as text input keypad and a numeric phone keypad.

2. Background Information

Many types of keyboard arrangements are known. The most widely used English-language alphabetic key arrangement is the QWERTY arrangement. Other types of standard English-language alphabetic key arrangements include the QWERTZ arrangement, the AZERTY arrangement, and the DVORAC arrangement. Alphabetic key arrangements are often presented along with a numeric key arrangement. In a common arrangement, the numbers one through nine and zero are positioned above the alphabetic keys. In another known numeric key arrangement, numbers share keys with the alphabetic characters, such as the top row of the QWERTY keyboard. In a common arrangement, the numeric key arrangement is separate and spaced to the side of the alphabetic/numeric key arrangement. This numeric keypad, which may be found on personal computer keyboard arrangements, places the numbers "7" "8" "9" arranged in the top row, "4" "5" "6" arranged in the second row, "1" "2" "3" arranged in the third row, and "0" in a bottom row.

In a common numeric phone key arrangement, the numbers "1" "2" "3" are arranged in the top row, "4" "5" "6" are arranged in the second row, the numbers "7" "8" "9" are arranged in the third row, and the numeral "0" is arranged in the middle of a fourth row between "*" and "#" keys. Phone keypads also often include an alphabetic key arrangement overlaying or coinciding with the numeric keys with three or four letters included on the keys for the numbers "2" through "9". Such alphanumeric phone keypads are used in many traditional handheld mobile communication devices, such as cellular handsets.

Mobile communication devices that include a combined text-entry keyboard and a telephony keyboard are also known. Examples of such mobile communication devices include mobile stations, cellular phones, wireless personal digital assistance (PDAs), two-way paging devices, and others. Combining a traditional style text-entry keyboard (e.g., a QWERTY-style keyboard) with a traditional style telephony keyboard on the same mobile communication device typically involves undesirable ergonomic and/or intuitive user interface compromises. One prior art mobile communication device implements a combined alphabetic and numeric keyboard by having the numeric characters share keys with alphabetic characters on the top row of the QWERTY keyboard. In another prior art device, the numeric characters share keys with alphabetical characters on the left side of the keyboard. Many other arrangements that integrate an alphabetic keyboard and a numeric keyboard for a mobile communication device have been proposed. To my knowledge, in all of these proposed arrangements, the text input and numeric keypads fully overlap.

Some mobile communication devices incorporate a reduced alphabetic keyboard, such as a QWERTY keyboard in which the number of alphabetic keys is reduced by including two alphabetic characters on most keys. Such devices include a disambiguation engine that analyzes the sequence of keystrokes to resolve the intended input. One such device superimposes a numeric phone keypad over the center of the alphabetic keypad with the "0" included on the spacebar.

There is room for improvement in keyboard arrangements for mobile communication devices that make them more intuitive and easier to use while limiting the overall size of the device.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
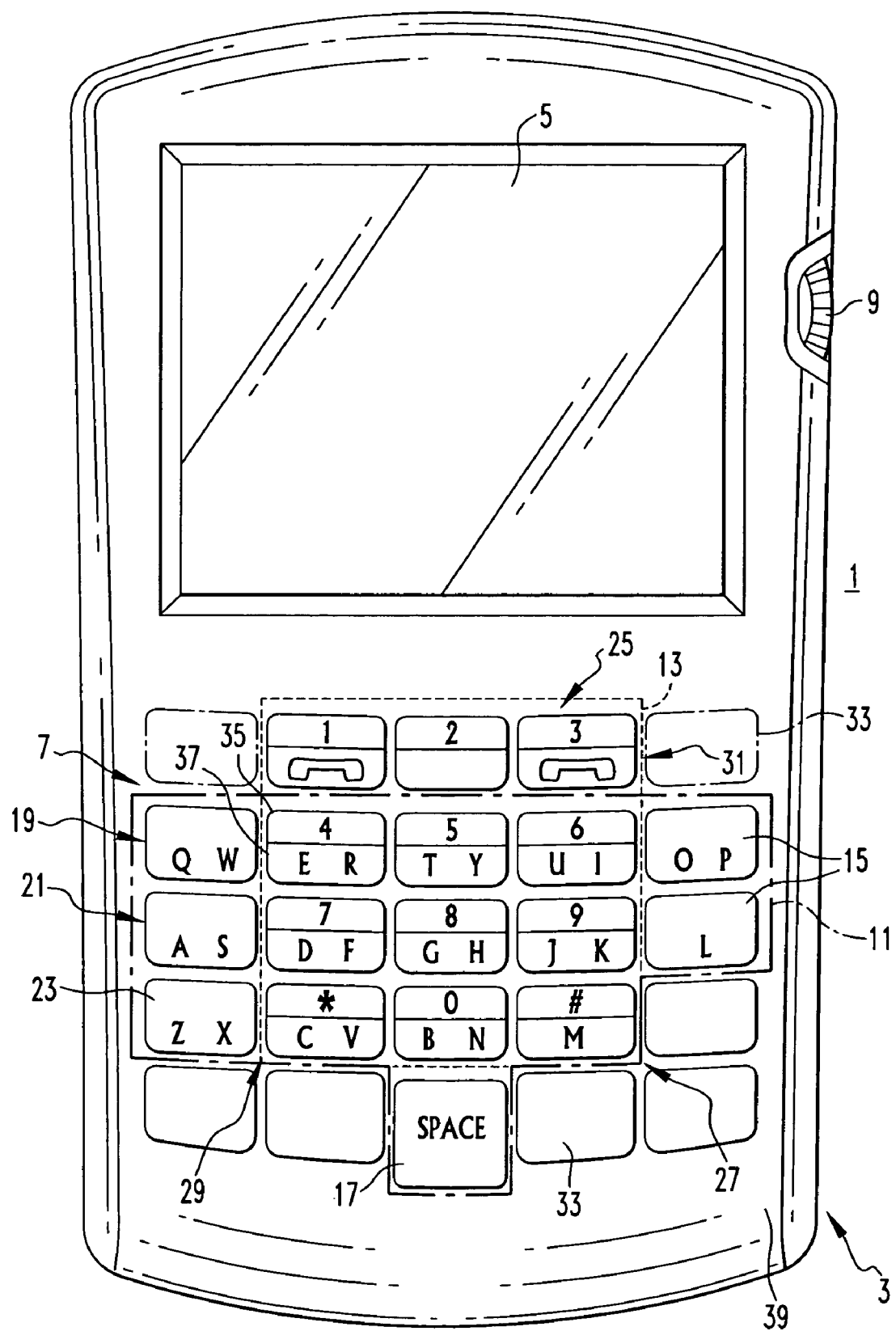
FIG. 1 is a front elevation view of a mobile communication device incorporating a physical keyboard in accordance with one embodiment of the invention.

FIG. 1 illustrates an example of a mobile communication device 1 incorporating aspects of the invention. The device 1 has a user input system 3 that includes a display 5, a physical keyboard 7 and a thumbwheel device 9. The physical keyboard 7 and the thumbwheel device 9 allow the user to input, select and manipulate text, data and functions that are presented on the display 5, as is known.

Various aspects of the invention are directed to the physical keyboard 7. As shown in FIG. 1, the physical keyboard 7 is made up of a first user interface 11 in the form of a first array of keys and a second user interface 13 in the form of a second array of keys. The first array of keys 11 constitute a text input keypad having a plurality of keys that includes keys 15 bearing alphabetic characters, and a spacebar 17. The alphabetic keys 15 are laid out in a reduced QWERTY keyboard arranged in three rows 19, 21 and 23. Each of these rows has five columns except the last row 23. Most of the alphabetic keys 15 represent two alphabetic characters as indicated. The spacebar 17 is centered under the pattern of alphabetic keys 15.

The second array of keys 13 constitutes a numeric phone keypad. The exemplary numeric phone keypad 13 corresponds to the international telecommunication union (ITU) Standard E.161, entitled "Arrangement of Digits, Letters, and Symbols on Telephones or Other Devices That Can Be Used for Gaining Access to a Telephone Network". This standard is also known as ANSI TI.703-1995/1999 and ISO/IEC 9995-8:1994. Thus, as can be seen from FIG. 1, the numeric phone pad 13 is laid out in four rows of three columns each with the bottom row containing the numeral "0" in the center flanked by the "*" symbol on the left and the "#" symbol on the right. Other numeric keypad arrangements could be utilized.

In accordance with aspects of the invention, the second array of keys 13, representing the numeric phone keypad is offset from the first array of keys representing the text input keypad. As a result, there is a subset 27 of the keys 25 of the numeric phone keypad 13 represented by the second, third and fourth rows of the second array which overlap and are therefore common with a subset 29 of keys in the second, third and fourth columns of the first, second and third rows of the text input keypad 11. Thus, one row, the top row 31 in FIG. 1, of the numeric phone keypad 13, extends above the alphabetic keys 15 of the text input keypad 11 so that the keys of this first row 31 are not in the subset 27 of the keys of the numeric phone keypad that are common with keys in the subset 29 of keys of the text input keyboard 11.

With the above described arrangement of the physical keyboard 7, the numeric phone keypad 13 can be more easily distinguished from the text input keypad 11 while at the same time realizing the better part of the efficiencies of having the two keypads share some keys.

The physical keyboard 7 also includes a number of auxiliary keys 33. As is well known, these auxiliary keys 33 can be used to implement functions such as enter, delete, backspace and the like. Some such auxiliary keys 33 can be located above the text input keypads such as in line with the top row 31 of the numeric phone keypad 13 as shown in FIG. 1.

Figure 2A:
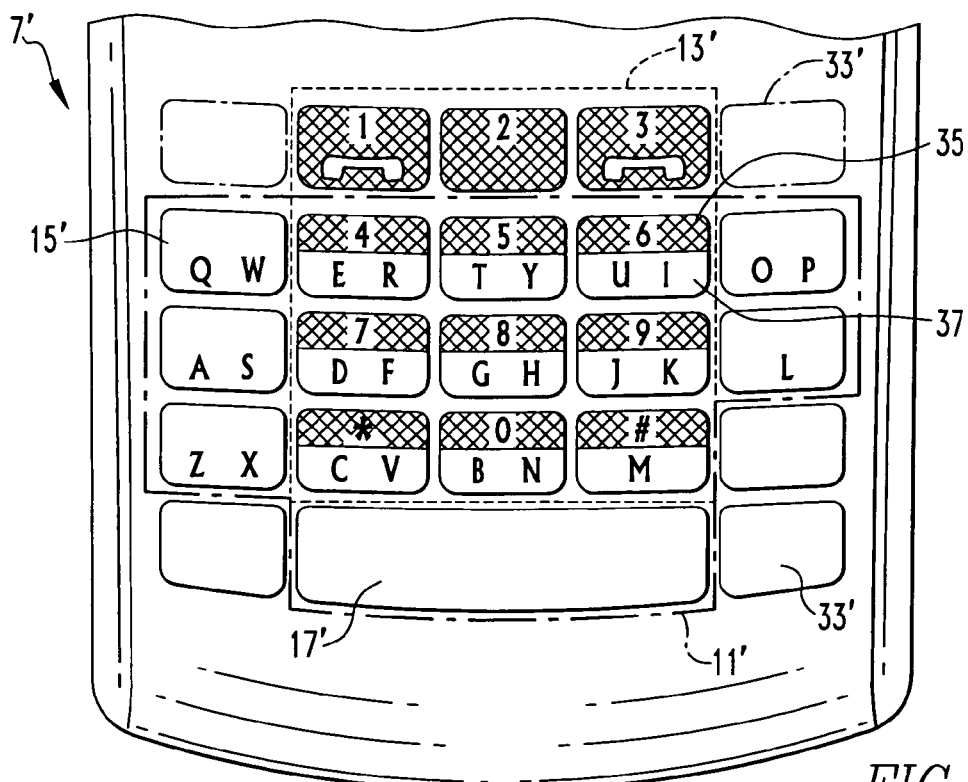
FIG. 2A is a partial front elevation view of a mobile communication device having a physical keyboard in accordance with another embodiment of the invention.

FIG. 2A illustrates another embodiment 7' of the physical keyboard. This keyboard 7' is similar to that of FIG. 1 except that the spacebar 17' is larger than the remainder of the keys. The exemplary spacebar 17' is elongated and extends under all three columns of the numeric phone keypad 13' to further help in identifying the boundary of the numeric phone keypad from that of the text input keypad 11'.

Figure 2B:
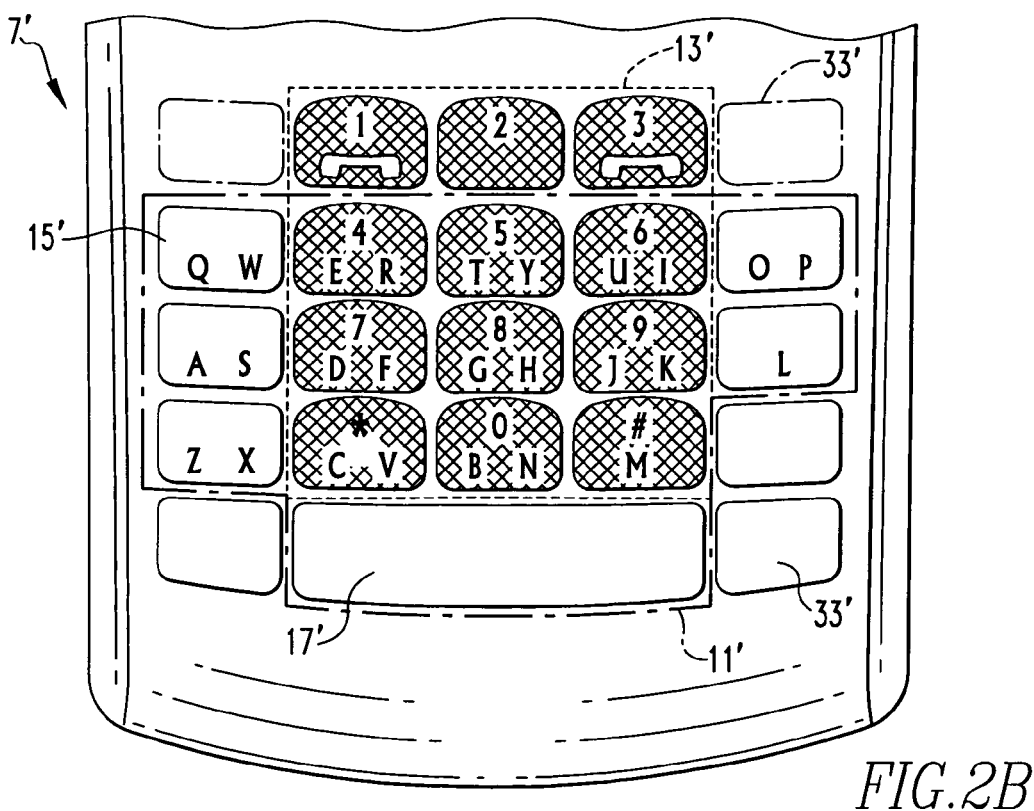
FIG. 2B is alternative embodiment of the keyboard shown in FIG. 2.

Additional variations are within the scope of the invention. For instance, other text input key arrangements other than the exemplary reduced QWERTY arrangement could be used for the text input keypad. The keys of the second array of keys 13 constituting the numeric phone keypad could be further distinguished in other ways, such as by making these keys a different size and/or shape as illustrated in FIG. 2b.

Other enhancements can be provided to further differentiate between the two overlapping keyboards. For instance, the faces of the common keys can be divided into sections such as with the numerals in the upper half 35 and the letters in the lower half 37 as shown in FIG. 2A. Different indicia can be utilized to further distinguish the two halves. For instance, different colors or textures could be used for the sections 33 and 35. Furthermore, these different colors or textures could be extended to the full face of the other keys of the respective arrays that are not common to both arrays as shown in FIG. 2A. Alternatively, the keys of the numeric phone keypad 13' could be provided with a different physical appearance such as a distinguishing color, surface texture, size or shape to make that keyboard stand out as shown in FIG. 2B.

Figure 3:
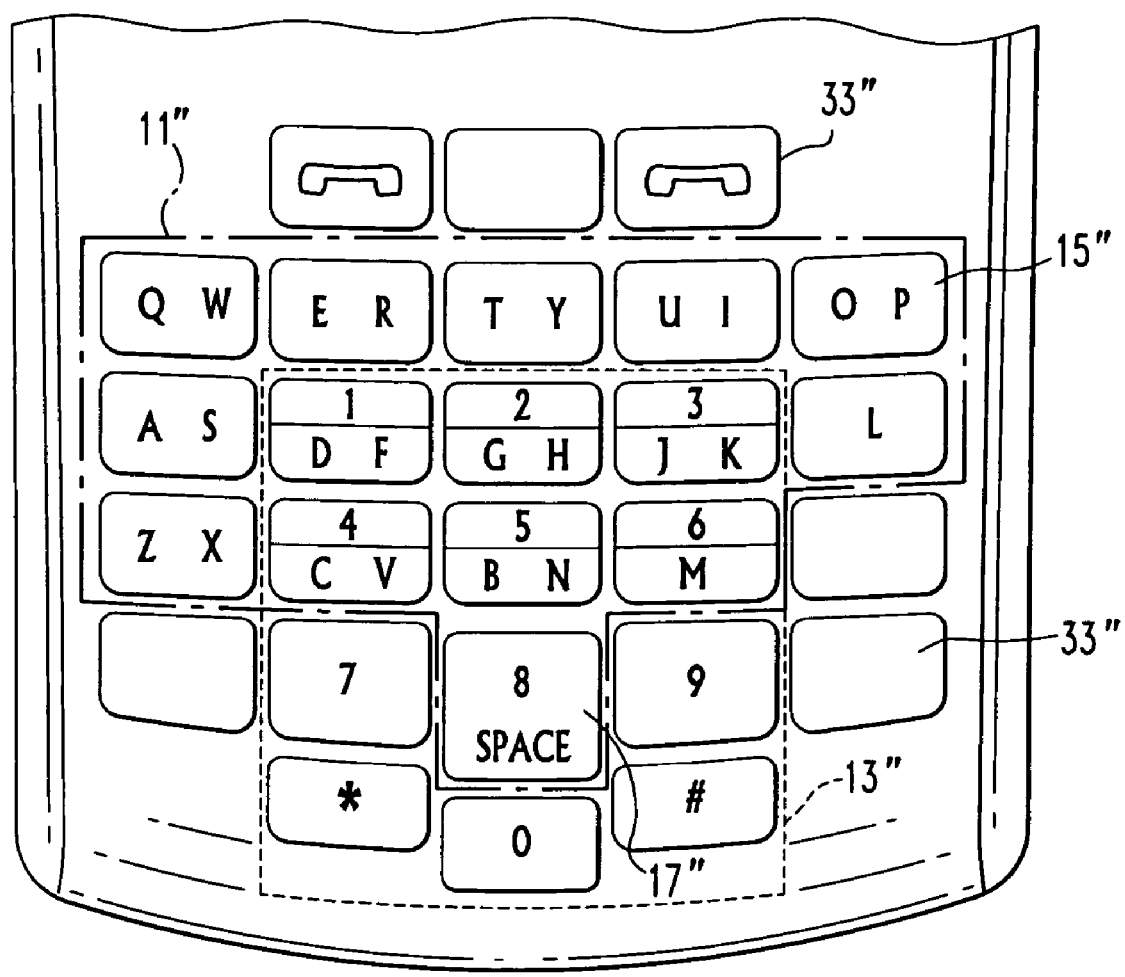
FIG. 3 is a partial front elevation view of a mobile communication device having a physical keyboard in accordance with yet another embodiment of the invention.

Yet another embodiment of the invention is illustrated in FIG. 3. Here, the second array of keys 13" of the physical keyboard 7" constituting the numeric phone keypad is offset vertically downward relative to the first array of keys 11" constituting the text input keypad. In this configuration, the top row of the numeric phone keypad 13" coincides with the second row of the alphabetic keys 15 of the text input keypad 11". Hence, the third row of the numeric phone keypad 13" is below the lowest row of alphabetic keys 15 forming the third row of the text input keypad 11". This puts the numeric phone key for the numeral "8" on the same key that forms the spacebar 17" for the text input keypad and extends the fourth row of the numeric phone keypad 13" containing keys with the characters "*", "0" and "#" in a separate row below all the other keys. In this arrangement some of the auxiliary keys 33" can be above, and aligned with, the numeric phone keypad.

Also, the numeric indicia for the numeric phone keypad 13 could be provided on the face 39 of the mobile communication device 1 adjacent the corresponding key rather than being on the key itself.

While specific embodiments of the invention have been described in detail, it will be appreciated by those skilled in the art that various modifications and alternatives to those details may be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A physical keyboard comprising:
    a first user interface comprising a first array of keys arranged in rows and columns; and
    a second user interface comprising a second array of keys arranged in rows and columns and comprising a numeric phone keypad;
    the second array of keys only partially overlapping the first array of keys so that only a subset of the first array of keys also comprise a subset of the second array of keys and are therefore common keys common to both the first and second arrays of keys;
    the keys of the second array of keys physically differing from the keys of the first array of keys that are not common by being different in at least one of surface color and surface texture;
    the keys in at least one row of the second array of keys not being common keys and being offset above the first array of keys; and
    wherein the first array of keys comprises a text input keypad, and wherein the text input keypad includes a spacebar that is not a common key but is adjacent a row of keys of the second array of keys and extends across multiple columns of the second array of keys, and wherein the spacebar extends across all columns of a bottom row of the second array of keys.

2. They physical keyboard of claim 1, wherein the at least one row of keys comprises a top row of the second array of keys.

3. The physical keyboard of claim 1, wherein the first array of keys comprises a text input keypad.

4. The physical keyboard of claim 3, wherein the reduced text input keypad is a reduced QWERTY keyboard.

5. A physical keyboard comprising:
    a first user interface comprising a first array of keys;
    a second user interface comprising a second array of keys;
    the second array of keys only partially overlapping the first array of keys so that only a subset of the first array of keys also comprise a subset of the second array of keys and are therefore common keys common to both the first and second array of keys; and
    wherein the first array of keys comprises a text input keypad and the second array of keys comprises a numeric phone keypad, and wherein the text input keypad includes a spacebar that is not a common key but is adjacent a row of keys of the second array of keys and extends across multiple columns of the second array of keys, and wherein the spacebar extends across all columns of a bottom row of the second array of keys.

6. The physical keyboard of claim 5, wherein the text input keypad comprises a reduced keyboard in which more than one alphabetical character is assigned to at least some of the keys.

7. A physical keyboard comprising:
a first user interface comprising a first array of keys arranged in rows and columns and comprising a text input keypad; and
a second user interface comprising a second array of keys arranged in rows and columns and comprising a numeric phone keypad;
the second array of keys only partially overlapping the first array of keys so that only a subset of the first array of keys also comprise a subset of the second array of keys and are therefore common keys common to both the first and second array of keys;
the keys in at least one row of the second array of keys not being common keys and being offset above the first array of keys; and
wherein the text input keypad comprises a reduced keyboard wherein at least some of the keys are used to input more than one alphabetical character and wherein the text input keypad includes a spacebar that is not a common key but is adjacent a row of keys of the second array of keys and extends across multiple columns of the second array of keys, and wherein the spacebar extends across all columns of a bottom row of the second array of keys.

8. A physical keyboard comprising:
a first user interface comprising a first array of keys arranged in rows and columns; and
a second user interface comprising a second array of keys arranged in rows and columns and comprising a numeric phone keypad;
the second array of keys only partially overlapping the first array of keys so that only a subset of the first array of keys also comprise a subset of the second array of keys and are therefore common keys to both the first and second array of keys;
the keys in at least one row of the second array of keys not being common keys and being offset above the first array of keys;
wherein the keys of the first array of keys have a first physical appearance and the keys of the second array of keys that are not common keys have a second physical appearance, and wherein the common keys share the first and second physical appearances,
wherein the first array of keys comprises a text input keypad, and wherein the text input keypad includes a spacebar that is not a common key but is adjacent a row of keys of the second array of keys and extends across multiple columns of the second array of keys, and wherein the spacebar extends across all columns of a bottom row of the second array of keys.

9. A mobile communication device comprising:
a display;
a physical keyboard for manipulating text, data and functions presented on the display, the physical keyboard comprising a text input keypad having a plurality of keys and a numerical phone keypad having a number of keys with a subset only of the number of keys of the numerical phone keypad comprising common keys that also comprise a subset of the plurality of keys of the text input keypad;
wherein the text input keypad comprises a reduced keyboard in which more than one alphabetical character is assigned to at least some of the keys; and
wherein keys of the numerical phone keypad are physically different from keys of the text input keypad that are not common keys and wherein the text input keypad includes a spacebar that is not a common key but is adjacent a row of keys of the second array of keys and extends across multiple columns of the second array of keys, and wherein the spacebar extends across all columns of a bottom row of the numerical phone keypad.

10. The mobile communication device of claim 9, wherein the plurality of keys of the text input keypad are arranged in rows and columns and the keys of the numerical phone keypad are also arranged in rows and columns with at least one row of the keys of the numerical phone keypad not being part of the subset of keys common with the subset of keys of the text input keypad.

11. The mobile communication device of claim 10, wherein the physical keypad also comprises additional function keys at least one of which is aligned with the keys of the at least one row of keys of the numerical phone keypad that is not a subset of keys common with the subset of keys of the text input keypad.

12. The mobile communication device of claim 11, wherein the text input keypad is a reduced QWERTY keyboard.

* * * * *

UNITED STATES PATENT AND TRADEMARK OFFICE
CERTIFICATE OF CORRECTION

| | | |
|---|---|---|
| PATENT NO. | : 7,864,949 B2 | Page 1 of 1 |
| APPLICATION NO. | : 11/229010 | |
| DATED | : January 4, 2011 | |
| INVENTOR(S) | : Krishna K. Pathiyal | |

It is certified that error appears in the above-identified patent and that said Letters Patent is hereby corrected as shown below:

Column 6 correct as follows:

Claim 12. The mobile communication device of claim ~~11~~9, wherein the
text input keypad is a reduced QWERTY keyboard.

Signed and Sealed this
Seventeenth Day of January, 2012

David J. Kappos
*Director of the United States Patent and Trademark Office*

UNITED STATES PATENT AND TRADEMARK OFFICE
CERTIFICATE OF CORRECTION

PATENT NO.         : 7,864,949 B2                                   Page 1 of 1
APPLICATION NO.    : 11/229010
DATED              : January 4, 2011
INVENTOR(S)        : Krishna K. Pathiyal It is certified that error appears in the above-identified patent and that said Letters Patent is hereby corrected as shown below:

Column 6, lines 43-45, Claim 12 should read as follows:

12. The mobile communication device of claim ~~11~~9, wherein the text input keypad is a reduced QWERTY keyboard.

This certificate supersedes the Certificate of Correction issued January 17, 2012.

Signed and Sealed this
Fourteenth Day of February, 2012

David J. Kappos
*Director of the United States Patent and Trademark Office*